US010718484B2

(12) United States Patent
Iwao et al.

(10) Patent No.: US 10,718,484 B2
(45) Date of Patent: Jul. 21, 2020

(54) FRONT STRUCTURE FOR VEHICLE AND VEHICLE

(71) Applicant: MAZDA MOTOR CORPORATION, Hiroshima (JP)

(72) Inventors: Norihito Iwao, Hiroshima (JP); Takahiro Matsui, Hiroshima (JP); Ryoma Makino, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/118,321

(22) Filed: Aug. 30, 2018

(65) Prior Publication Data
US 2019/0086054 A1    Mar. 21, 2019

(30) Foreign Application Priority Data

Sep. 20, 2017 (JP) .................................. 2017-179827

(51) Int. Cl.
*B60Q 1/04* (2006.01)
*B60Q 1/34* (2006.01)
(Continued)

(52) U.S. Cl.
CPC ............ *F21S 45/43* (2018.01); *B60Q 1/0035* (2013.01); *B60Q 1/0047* (2013.01);
(Continued)

(58) Field of Classification Search
CPC .. B60Q 1/0035; B60Q 1/0047; B60Q 1/0408; B60Q 1/076; B60Q 1/12; B60Q 1/34;
(Continued)

(56) References Cited

U.S. PATENT DOCUMENTS 7,329,033 B2 *  2/2008  Glovatsky ............ B60Q 1/0052
                                                                    362/547
8,256,944 B2 *  9/2012  Yasuda .................... F21V 29/74
                                                                    362/547
(Continued)

FOREIGN PATENT DOCUMENTS

JP    2007-109613 A    4/2007
JP    2010-118344 A    5/2010
JP    2017-081291 A    5/2017

OTHER PUBLICATIONS

An Office Action mailed by the Japanese Patent Office dated Oct. 23, 2018, which corresponds to Japanese Patent Application No. 2017-179827 and is related to U.S. Appl. No. 16/118,321.

*Primary Examiner* — Arman B Fallahkhair
(74) *Attorney, Agent, or Firm* — Studebaker & Brackett PC

(57) ABSTRACT

Lamp unit includes a housing having a front opening portion and a rear opening portion, and a lamp main body disposed in the housing. The lamp main body includes a lamp case extending in a longitudinal direction of the vehicle in a position closer to a widthwise outer side of the front opening portion and spaced away from a widthwise outer edge of the front opening portion toward a widthwise inner side, and inner side and first outer side heat dissipation fins and protruding from the lamp case to the inner side and outer side in the vehicle width direction. The outer side heat dissipation fin protrudes greater than the inner side heat dissipation fin.

7 Claims, 11 Drawing Sheets

(51) Int. Cl.
    *B60R 13/04*     (2006.01)
    *F21S 45/43*     (2018.01)
    *B60Q 1/12*     (2006.01)
    *B60Q 1/00*     (2006.01)
    *F21S 45/48*     (2018.01)
    *F21S 43/237*     (2018.01)
    *F21S 43/245*     (2018.01)
    *B60Q 1/076*     (2006.01)
    *B60R 19/50*     (2006.01)
    *F21W 103/20*     (2018.01)
    *F21W 102/13*     (2018.01)

(52) U.S. Cl.
    CPC ........... *B60Q 1/0408* (2013.01); *B60Q 1/076* (2013.01); *B60Q 1/12* (2013.01); *B60Q 1/34* (2013.01); *B60R 13/04* (2013.01); *B60R 19/50* (2013.01); *F21S 43/237* (2018.01); *F21S 43/245* (2018.01); *F21S 45/48* (2018.01); *B60R 2019/505* (2013.01); *F21W 2102/13* (2018.01); *F21W 2103/20* (2018.01)

(58) Field of Classification Search
    CPC ... B60R 13/04; B60R 19/50; B60R 2019/505; F21S 43/237; F21S 43/245; F21S 45/43; F21S 45/48; F21W 2102/13; F21W 2103/20
    See application file for complete search history.

(56) References Cited

U.S. PATENT DOCUMENTS

| | | | |
|---|---|---|---|
| 10,300,837 B2* | 5/2019 | Iwao | B60Q 1/04 |
| 2009/0059594 A1* | 3/2009 | Lin | F21K 9/00 |
| | | | 362/294 |
| 2013/0063960 A1* | 3/2013 | Nakano | F21S 41/192 |
| | | | 362/516 |
| 2016/0281954 A1* | 9/2016 | Moisy | B60Q 1/0408 |
| 2017/0297476 A1 | 10/2017 | Iwao et al. | |
| 2018/0135827 A1* | 5/2018 | Lee | F21V 29/51 |

* cited by examiner

FRONT STRUCTURE FOR VEHICLE AND VEHICLE

TECHNICAL FIELD

The present invention relates to a front structure for a vehicle equipped with lamp units such as head lamps provided in both end portions of a vehicle front portion in a vehicle width direction, and a vehicle.

BACKGROUND ART

A front structure for a vehicle such as an automobile of this kind is provided with a front bumper fascia disposed in a vehicle front portion, an engine hood having a front end portion opposing to an upper end portion of the front bumper fascia, and front fenders extending from widthwise both side edges of the engine hood. The front bumper fascia includes a fascia base disposed in the vehicle front portion and provided with a front grille opening portion in a widthwise center portion, a front grille disposed in the front grille opening portion, and head lamp units disposed in right and left end portions of the fascia base and spaced from the front grille.

Such a vehicle front structure which enables the head lamp unit to be efficiently cooled and accomplish the both of a reduction in the front-rear length of the head lamp unit and required cooling performance is disclosed in, for example, Japanese Unexamined Patent Publication No. 2017-81291 (hereinafter referred to as "Patent Document 1").

Specifically, the head lamp unit recited in Patent Document 1 includes a housing formed with a unit case opened upward and a cover member which closes an upper opening portion of the unit case, and a lamp main body housed in the housing. The housing has a front opening portion which is opened to the front of the vehicle and a rear opening portion which is opened to the rear of the vehicle, and the lamp main body is disposed between the front opening portion and the rear opening portion. With such configuration, as the vehicle runs, running wind flows from the front opening portion to the rear opening portion, so that the running wind efficiently cools the lamp main body.

In the front structure of the vehicle as recited in Patent Document 1, the lamp main body is disposed at a position closer to a widthwise outer side of the front opening portion, and spaced away from a widthwise outer edge of the front opening portion toward a widthwise inner side. This disposing of the lamp main body enables efficient light-up of the front of the vehicle and improves the design of the vehicle in a front view.

However, in the case that the lamp main body is disposed at a position closer to the outer side in the front opening portion in this manner, the lamp main body has a difference in the cooling efficiency between an inner side portion and an outer side portion of the lamp main body in the vehicle width direction, so that the lamp main body cannot be effectively cooled in its entirety.

Specifically, because the front opening portion of the housing has a smaller opening area on the widthwise outer side of the lamp main body than an opening area on the inner side, the running wind has different flows between on the outer side and on the inner side of the lamp main body in the vehicle width direction, so that the cooling efficiency of the lamp main body by running wind taken in through the front opening portion becomes different between on the outer side and on the inner side in the vehicle width direction, resulting in failing to efficiently cool the lamp main body.

SUMMARY OF INVENTION

An object of the present invention is therefore to provide a front structure for a vehicle, the front structure which can more effectively cool a lamp main body in its entirety by reducing the difference in the cooling efficiency between an inner side portion and an outer side portion of the lamp main body in a vehicle width direction, and a vehicle has the front structure thus configured in view of the above problem.

In order to solve the above problem, the front structure for a vehicle according to the present invention includes lamp units provided in widthwise both end portions of a front portion of the vehicle, in which each of the lamp units is provided with a housing including a peripheral side wall having a front opening portion opened toward the front of the vehicle and a rear opening portion opened toward the rear of the vehicle, and a lamp main body disposed in the housing, the lamp main body including a main body case extending in a longitudinal direction of the vehicle in a position closer to a widthwise outer side of the front opening portion, and spaced away from a widthwise outer edge of the front opening portion toward a widthwise inner side, and an inner side heat dissipation portion and an outer side heat dissipation portion protruding from the main body case toward the inner side and the outer side in the vehicle width direction, the outer side heat dissipation portion protruding greater than the inner side heat dissipation portion.

According to the present invention, since the lamp unit is provided with the housing including the peripheral side wall having opening portions on the front and rear sides which are opened toward the front and the rear of the vehicle, and the lamp main body including the main body case, and the inner side heat dissipation portion and the outer side heat dissipation portion, an air flow generates from the front opening portion to the rear opening portion as the vehicle runs, so that the lamp main body can be cooled by the air flow. Additionally, since the main body case extends in a longitudinal direction of the vehicle in the position closer to the widthwise outer side of the front opening portion, and spaced away from the widthwise outer edge of the front opening portion toward the widthwise inner side, the running front can be effectively illuminated and the front portion of the vehicle can be imparted with an improved design. Moreover, since the outer side heat dissipation portion protrudes greater than the inner side heat dissipation portion, the surface area of the outer side heat dissipation portion becomes larger to make it possible to compensate for the difference in the flow of running wind between the widthwise inner side and the widthwise outer side of the main body case. Therefore, the reduced difference in the cooling efficiency between the inner side portion and the outer side portion of the lamp main body makes it possible to cool the lamp main body more effectively in its entirety.

DESCRIPTION OF EMBODIMENTS

Figure 1:
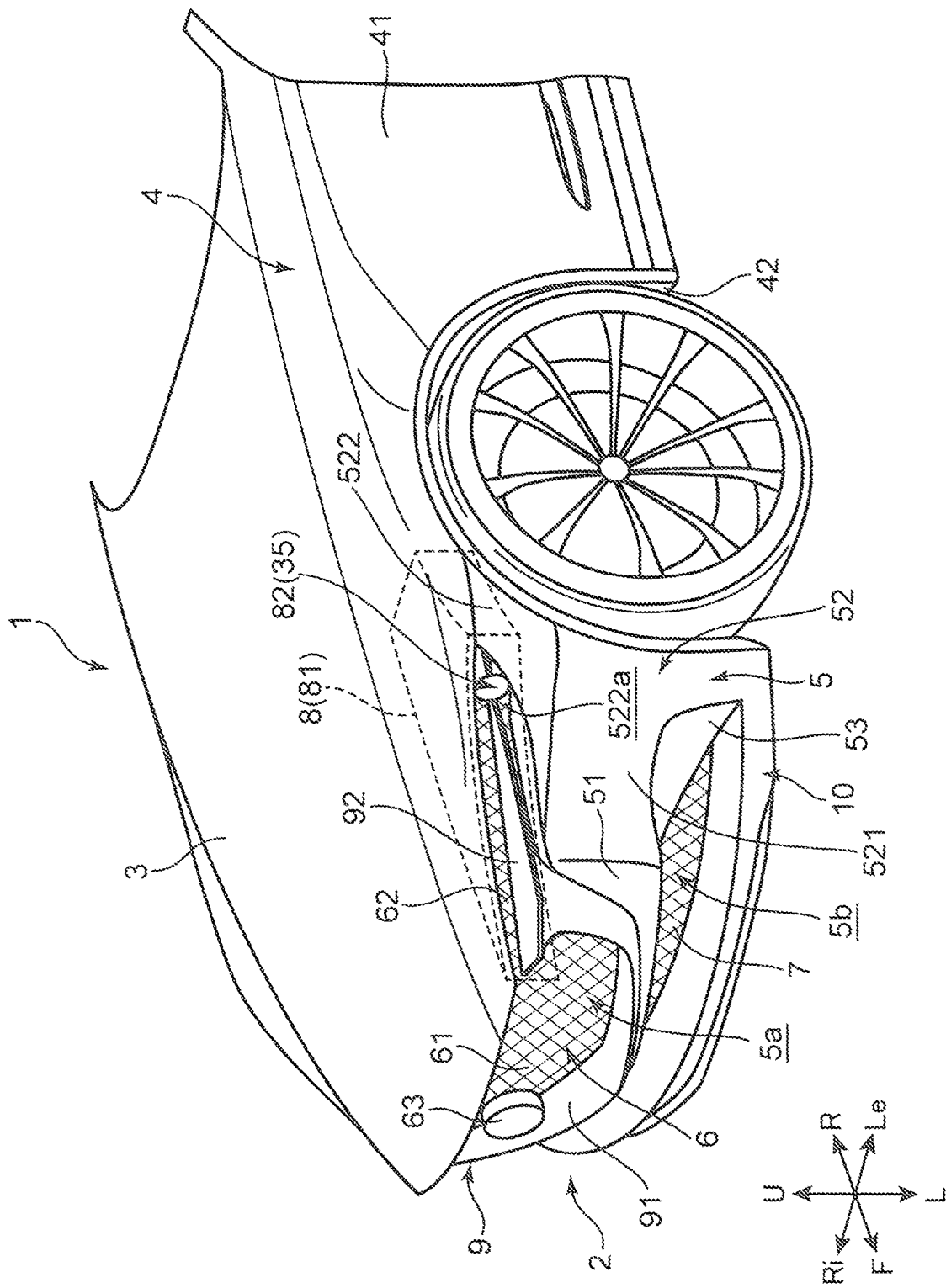
FIG. 1 is a perspective view showing an exemplary front portion of a vehicle to which the present invention is applied.
Figure 2:
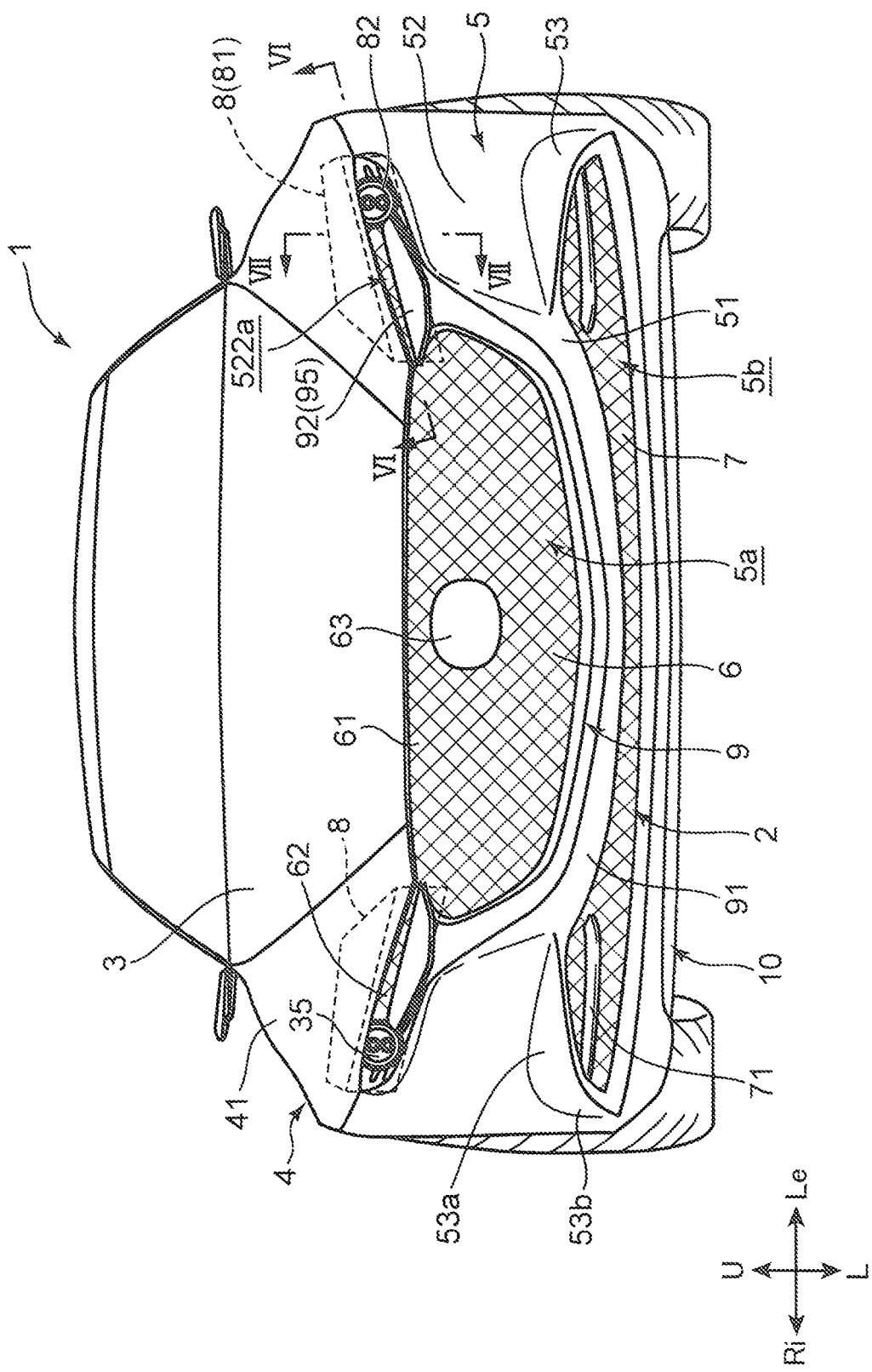
FIG. 2 is a front view of the front portion of the vehicle.
Figure 3:
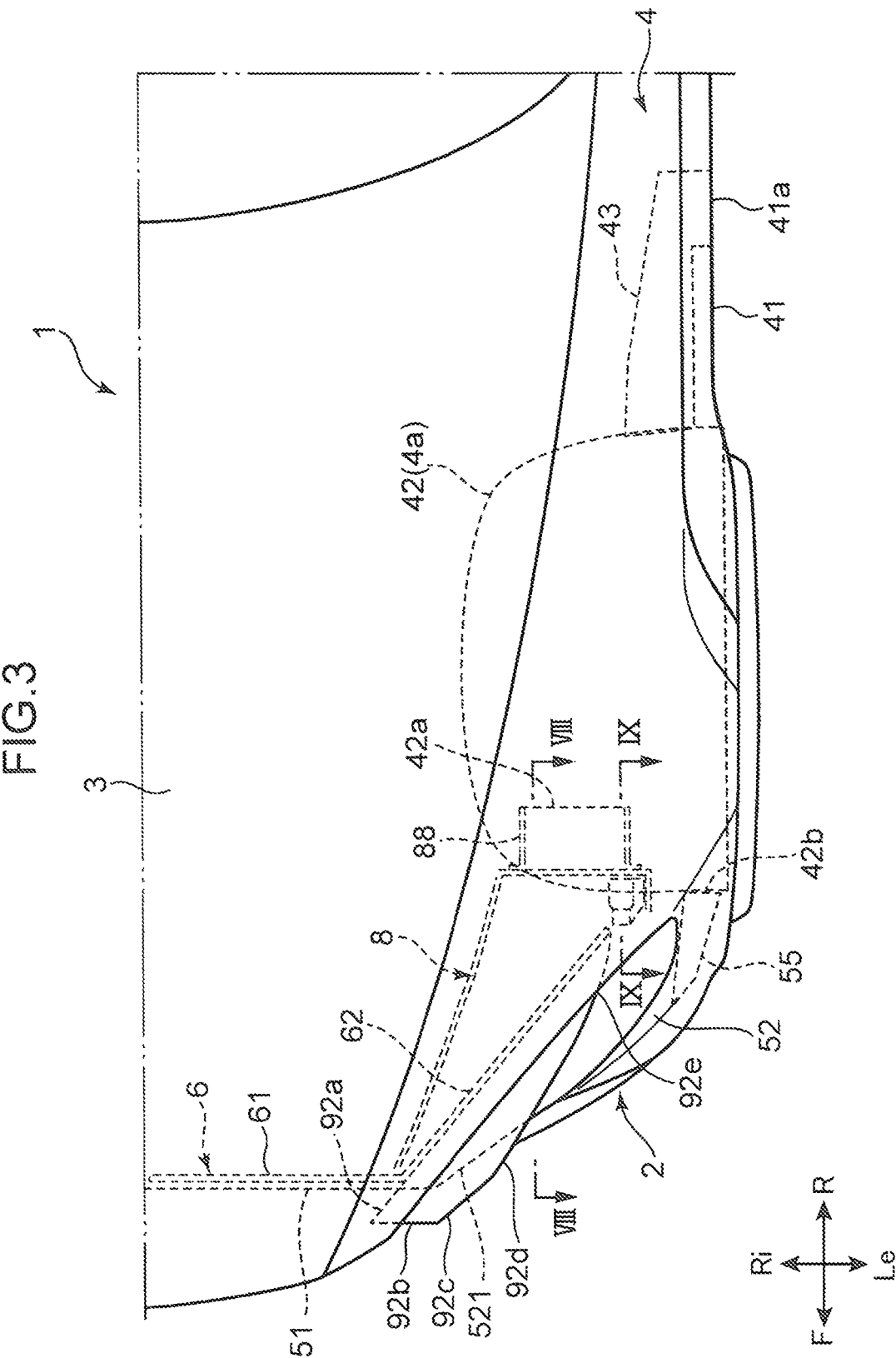
FIG. 3 is a partly enlarged plan view of the front portion of the vehicle.
Figure 4:
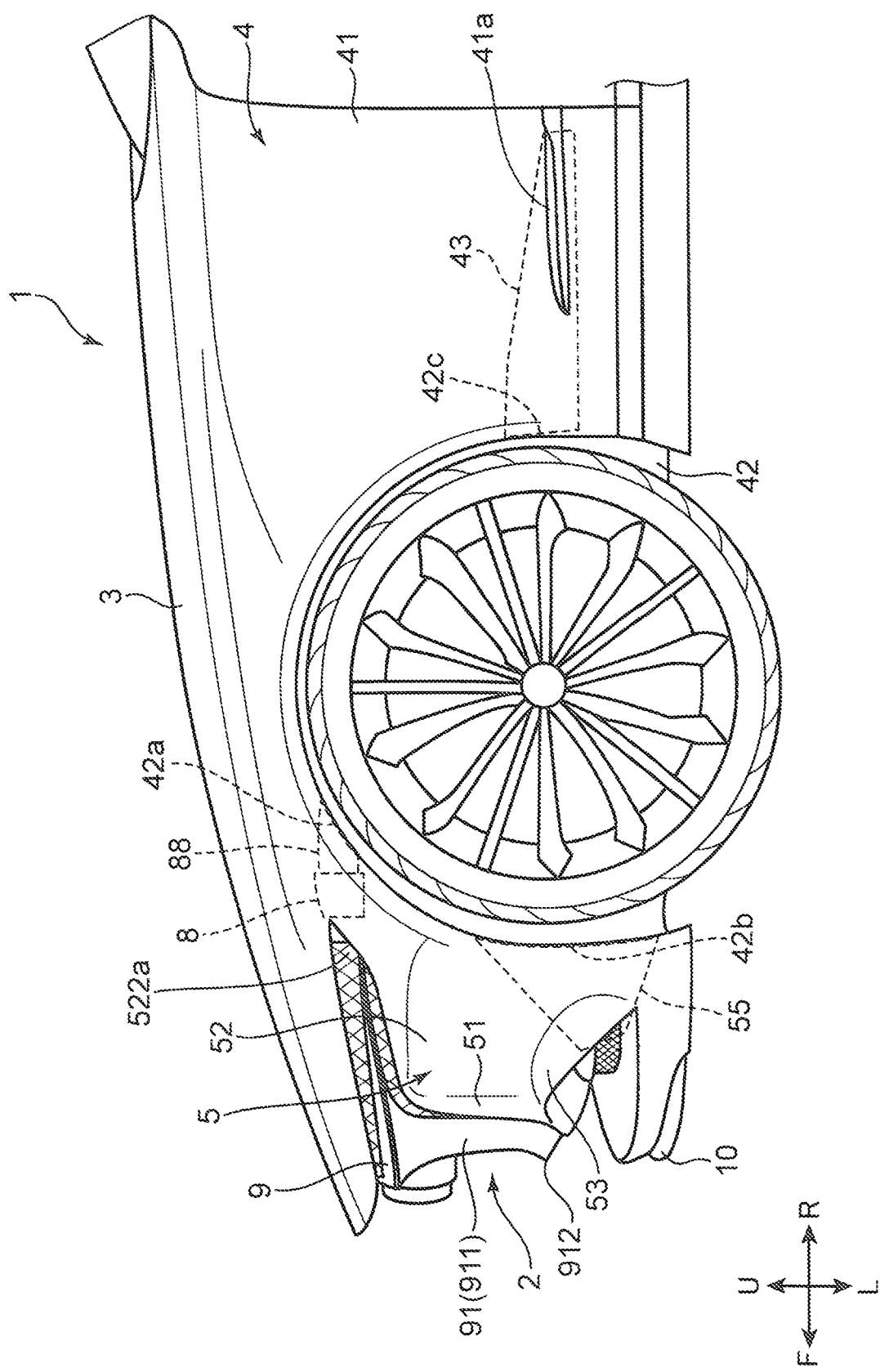
FIG. 4 is a partly enlarged side view of the front portion of the vehicle.
Figure 5:
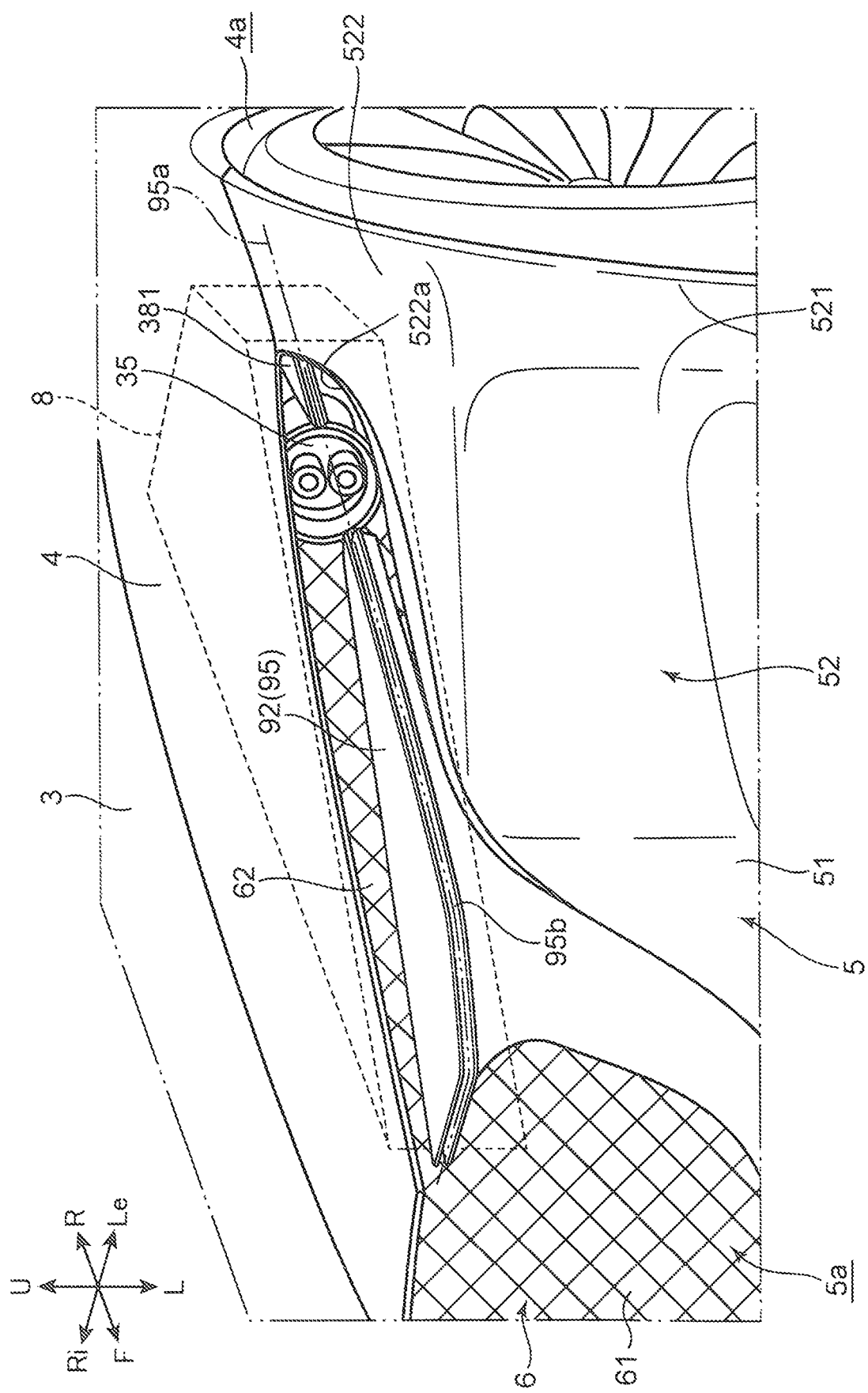
FIG. 5 is an enlarged perspective view showing an exterior structure of a vehicle according to an embodiment of the present invention.

In the following, an embodiment of the present invention will be described in detail with reference to the drawings. FIGS. 1 and 2 are a perspective view and a front view showing an exemplary front portion of a vehicle to which the present invention is applied. FIGS. 3 and 4 are a partly enlarged plan view and a partly enlarged side view of the front portion of the vehicle. FIG. 5 is a partly enlarged perspective view showing an exterior structure of a vehicle according to an embodiment of the present invention.

The respective directions indicated by "F", "R", "Le", "Ri", "U", and "L" in the drawings represent the respective directions of front, rear, left, right, up, and down of a vehicle. It is assumed that a front-rear direction of the vehicle corresponds to a longitudinal direction of the vehicle, a right-left direction of the vehicle corresponds to a vehicle width direction, and an up-down direction of the vehicle corresponds to a vehicle height direction.

[Structure of Front Portion of Vehicle 1]

A front portion of a vehicle 1 is symmetrically formed and includes a front bumper fascia 2 (hereinafter, simply referred to as "fascia 2") disposed in a front end portion of the vehicle in a longitudinal direction, an engine hood 3 having a front end portion opposing to an upper end portion of the fascia 2, and front fenders 4 extending from widthwise both end edges of the engine hood 3 and a vehicle height direction to form a side wall of the front portion of the vehicle 1, as well as forming front wheel houses 4a (see FIG. 3) as shown in FIG. 1. The front portion of the vehicle 1 governs design of the front portion of the vehicle 1 as an exterior structure of the vehicle 1.

The fascia 2 forms a front wall of the vehicle 1. In the present embodiment, the fascia 2 is configured to recede backward as advancing from a widthwise center part to both side end portions. A specific configuration of the fascia 2 will be described later.

The engine hood 3 forms an upper wall in the front portion of the vehicle 1 as shown in FIG. 4. The engine hood 3 inclines downward toward the front of the vehicle 1 to improve aerial characteristics. In the present embodiment, an inclination angle of the engine hood 3 is set to become larger toward the front. The front end portion of the engine hood 3 is opposed to the upper end portion of the fascia 2 in a state of protruding ahead of the upper end portion of the fascia 2.

The front fender 4 mainly forms the side wall of the front portion of the vehicle 1. As shown in FIG. 4, the front fender 4 includes a front fender panel 41 forming the side wall of the vehicle 1, and a front fender liner 42 joined to an inner surface of the front fender panel 41 in the vehicle width direction and forming the front wheel house 4a (see FIG. 3). The front fender liner 42 has a shape which allows running wind to be introduced into the front wheel house 4a. In the present embodiment, the front fender liner 42 has an upper fender opening portion 42a and a lower fender opening portion 42b provided below the upper fender opening portion 42a in its front portion. A lamp duct 88 to be described later is connected to the upper fender opening portion 42a. A lower duct 55 to be described later is connected to the lower fender opening portion 42b. Running wind is introduced into the front wheel house 4a through these ducts 88 and 55. These opening portions 42a and 42b are directed to a brake (not shown) in the front wheel house 4a such that the brake can be cooled by introduced running wind. On the other hand, the front fender liner 42 has a rear fender opening portion 42c at a height position between these opening portions 42a and 42b in its rear portion, for discharging the introduced running wind. The rear fender opening portion 42c is connected to a side duct 43 to communicate with a side of the vehicle 1 through a side lower opening portion 41a provided in the front fender panel 41.

Next, the fascia 2 will be described in detail. As shown in FIGS. 1 and 2, the fascia 2 includes a fascia base 5 (corresponding to a bumper fascia base) having a front grille opening portion 5a and a lower grille opening portion 5b and covering the front end portion of the vehicle 1, a front grille 6 and a bumper grille 7 disposed in the front grille opening portion 5a and the lower grille opening portion 5b, respectively, a pair of right and left lamp units 8 provided in widthwise both end portions of the fascia base 5, a decoration member 9 disposed along the fascia base 5 in a manner of straddling a space between the lamp units 8, and a front spoiler 10 disposed on a lower end of the fascia base 5 so as to protrude ahead of the fascia base 5. In the present embodiment, the front spoiler 10, which has a curved shape protruding forward viewed from the top, is integrally provided with the fascia base 5 to reduce joints. The front spoiler 10 may be provided separately from the fascia base 5.

<Fascia Base 5>

The fascia base 5 is a main constituent member of the fascia 2 and constitutes a skin of the front portion of the vehicle 1. In the present embodiment, since the fascia base 5 is integrally molded with the front spoiler 10, the lower grille opening portion 5b is provided between the fascia base 5 and the front spoiler 10 along the vehicle width direction.

Specifically, the fascia base 5 includes a center face portion 51 provided with the front grille opening portion 5a, right and left inclined side portions 52 provided continuously to right and left side edges of the center face portion 51 and receding rearward as advancing to the widthwise outer sides, and duct louvers 53 provided continuously to respective lower ends of the inclined side portions 52 as shown in FIGS. 1 and 2. In the fascia base 5, the lower grille opening portion 5b is provided below the center face portion 51 and the inclined side portions 52 so as to straddle the right and left duct louvers 53.

The center face portion 51, which is a wall portion disposed in a widthwise center portion and generally vertical, has an upper part thereof notched to have a flat U-shape, thereby forming the front grille opening portion 5a. The front end portion of the engine hood 3 and a front end portion of the front fender 4 are opposed to each other above the front grille opening portion 5a. In the present embodiment, a front face of the center face portion 51 is configured to have a curved surface protruding slightly forward and curving along the vehicle width direction.

The inclined side portions 52 are wall portions provided on the left edge or the right edge of the center face portion 51 so as to be integral with the center face portion 51. Specifically, each of the inclined side portions 52 is provided with a side wall main body 521 receding rearward as advancing in the widthwise outer side, and provided, in an upper end edge of the side wall main body 521, with a side upper wall 522 extending smoothly to continue to a front end edge of the front fender 4 as shown in FIG. 5.

The side wall main body 521 is formed to have a flat plate shape. An inclination angle of the side wall main body 521 is not particularly limited and is preferably set within a range of about 20° to about 60° with respect to the center face portion 51 (or a vertical surface including the vehicle width direction), and in the present embodiment, is set to about 40° as shown in FIG. 3. A widthwise outer side end portion of the side wall main body 521 is curved rearward to face the front wheel house 4a.

The side upper wall 522 is formed with a smooth curved surface and has a widthwise outer side end portion which is curved rearward to face the front wheel house 4a as clearly shown in FIG. 5. The side upper wall 522 is also formed with a front side opening portion 522a in a widthwise inner side portion of an upper end portion, in more detail, by cutting out the upper end portion with the widthwise outer side end portion left. An upper edge portion of the side upper wall 522 facing the front side opening portion 522a is curved rearward of the vehicle (see FIGS. 8 and 9). The widthwise inner side portion of the front side opening portion 522a communicates with the front grille opening portion 5a and extending narrowly while inclining upward as advancing to the widthwise outer side, thereby creating a more aggressive look in a front view. The front end portion of the front fender 4 faces an upper part of the front side opening portion 522a.

The duct louvers 53 are provided at respective lower end edges of the inclined side portions 52 in a manner of protruding forward. The duct louver 53 includes a top wall 53a extending in the vehicle width direction and lowering forward, and a side wall 53b extending downward from a widthwise outer end edge of the top wall 53a as shown in FIG. 2, thereby rectifying running wind introduced into the lower grille opening portion 5b. The lower grille opening portion 5b communicates with the front wheel house 4a through the lower duct 55.

<Front Grille 6>

The front grille 6 is a net-shaped body disposed in the front grille opening portion 5a and the front side opening portion 522a as shown in FIGS. 1 and 2. Specifically, the front grille 6 includes a center grille 61 attached to the fascia base 5 in a state of being fit in the front grille opening portion 5a, and extension grilles 62 extending in the vehicle width directions from an outer side upper end portion of the center grille 61 and attached to the fascia base 5 in a state of being fit in the front side opening portions 522a, the center grille 61 and the extension grilles 62 being integral with each other in the present embodiment. The center grille 61, which is configured to have a generally pentagonal flat shape in a front view, has an emblem 63 attached to the center thereof. Each of the extension grille 62 extends upward obliquely in a front view from the upper end portion of the center grille 61 along the front side opening portion 522a to reach a widthwise inner side edge portion of a cylinder head lamp 35 to be described later in the lamp units 8 as clearly shown in FIG. 5. The extension grille 62 is disposed at a position retracted rearward from a front end edge of the front side opening portion 522a in the side upper wall 522 so as to recede rearward as advancing to the widthwise outer side as shown in FIG. 3. The extension grille 62 is disposed ahead of the lamp unit 8 to introduce running wind into the lamp unit 8 through the extension grille 62.

<Bumper Grille 7>

The bumper grille 7 is a net-shaped body disposed in the lower grille opening portion 5b. The bumper grille 7 is configured to have a curved shape narrowly extending in the right-left direction from one end portion to the other end portion in the vehicle width direction and protruding forward along the lower grille opening portion 5b. As shown in FIG. 2, each of lower rectifier plates 71 having an upper surfaces inclining upward toward the rear side are attached to front surfaces of right and left end portions of the bumper grille 7 and below the duct louvers 53.

<Lamp Units 8>

On the other hand, the lamp units 8 are disposed in the rear of the front side opening portions 522a of the fascia base 5 as shown in FIGS. 4 and 5. In the present embodiment, the lamp unit 8 has at least both a head lamp function and a turn lamp function, and is configured as an outer lensless lamp unit in which an outer lens is omitted. The pair of right and left lamp units 8 are provided. However, since the lamp units are substantially the same as each other except that the lamp units have shapes symmetrical to each other, description will be here made about the lamp unit 8 disposed on the left side in the vehicle width direction.

Figure 6:
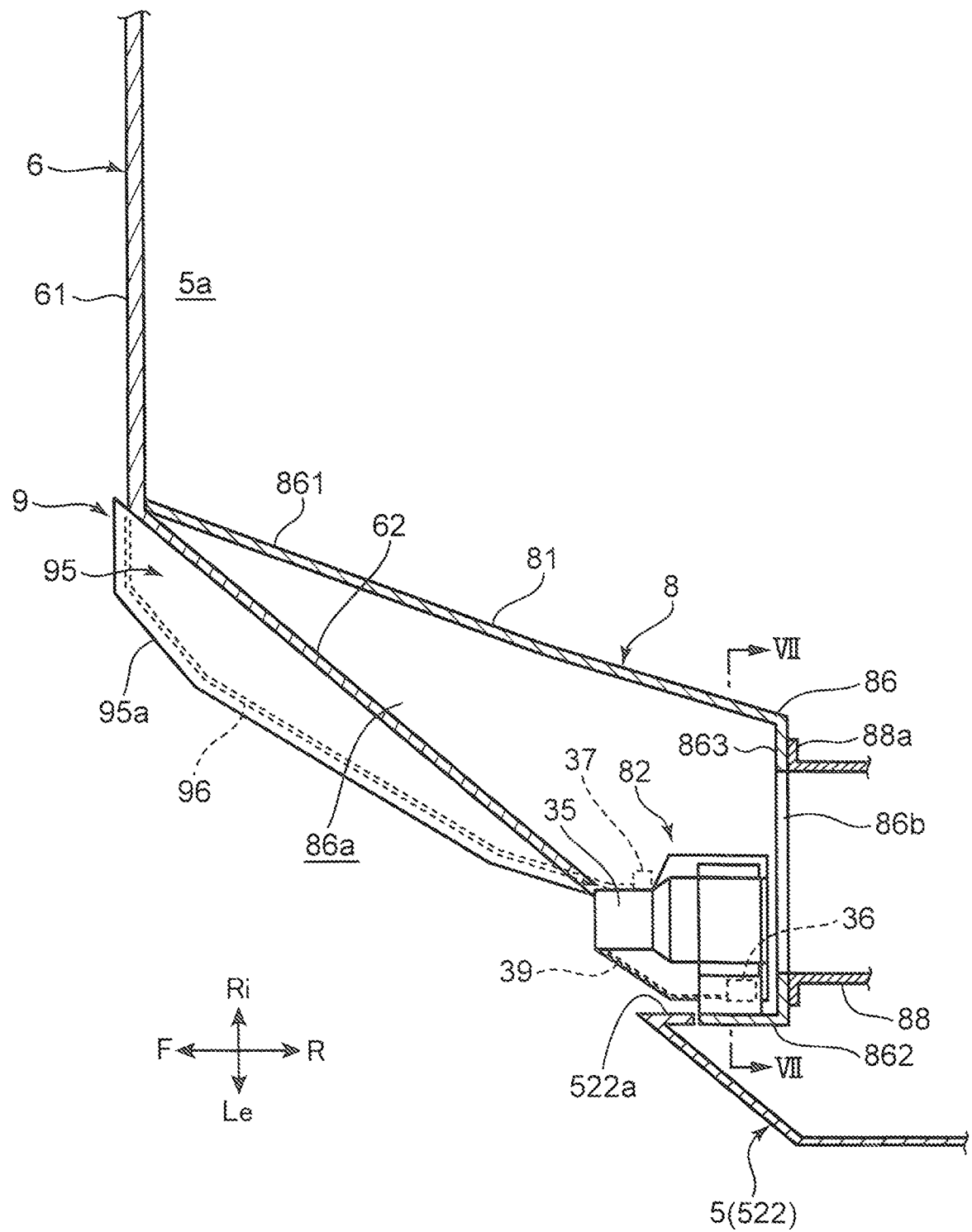
FIG. 6 is a schematic sectional view taken along line VI-VI in FIG. 2.
Figure 7:
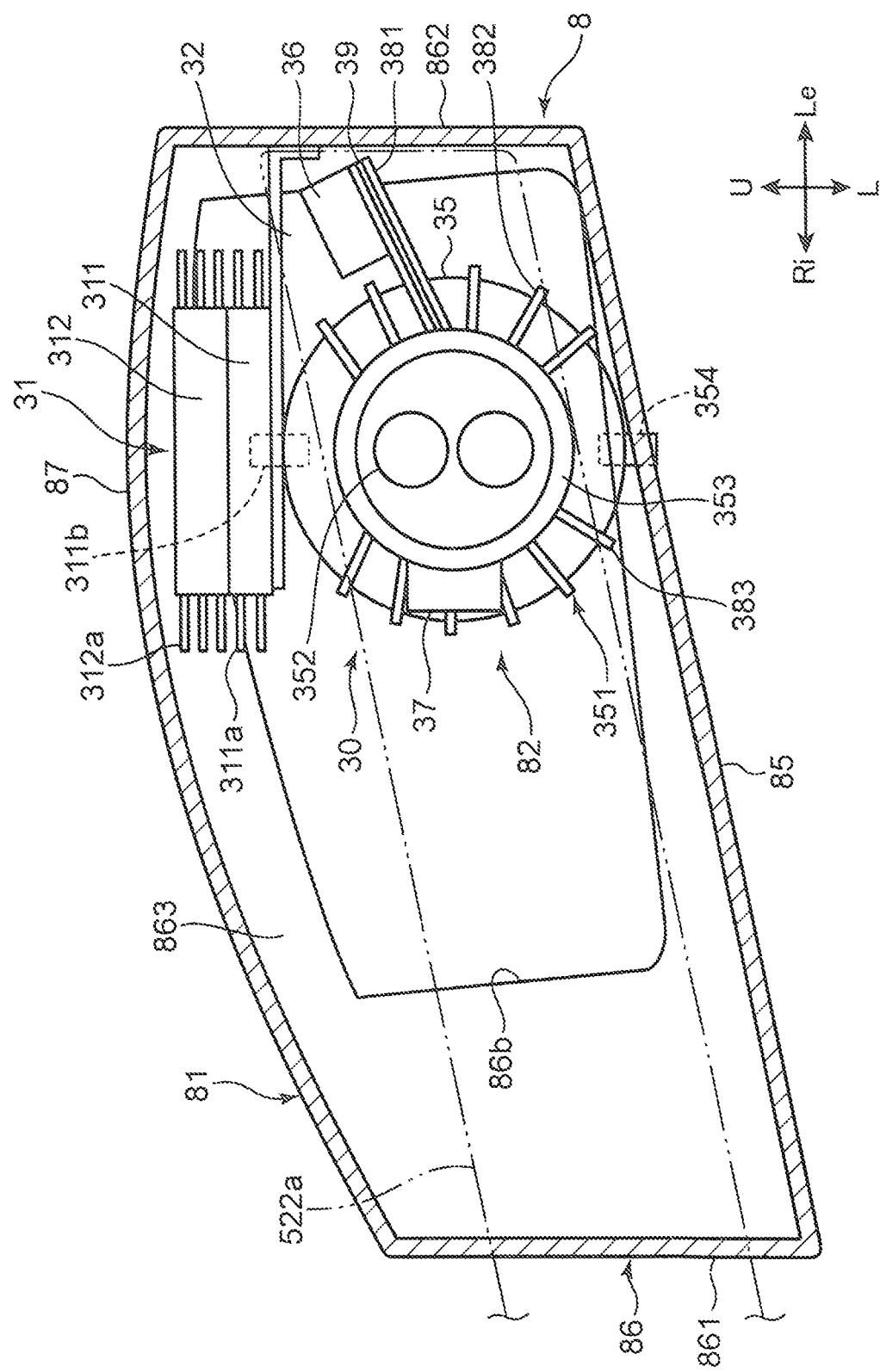
FIG. 7 is a schematic sectional view taken along line VII-VII in FIG. 6.
Figure 8:
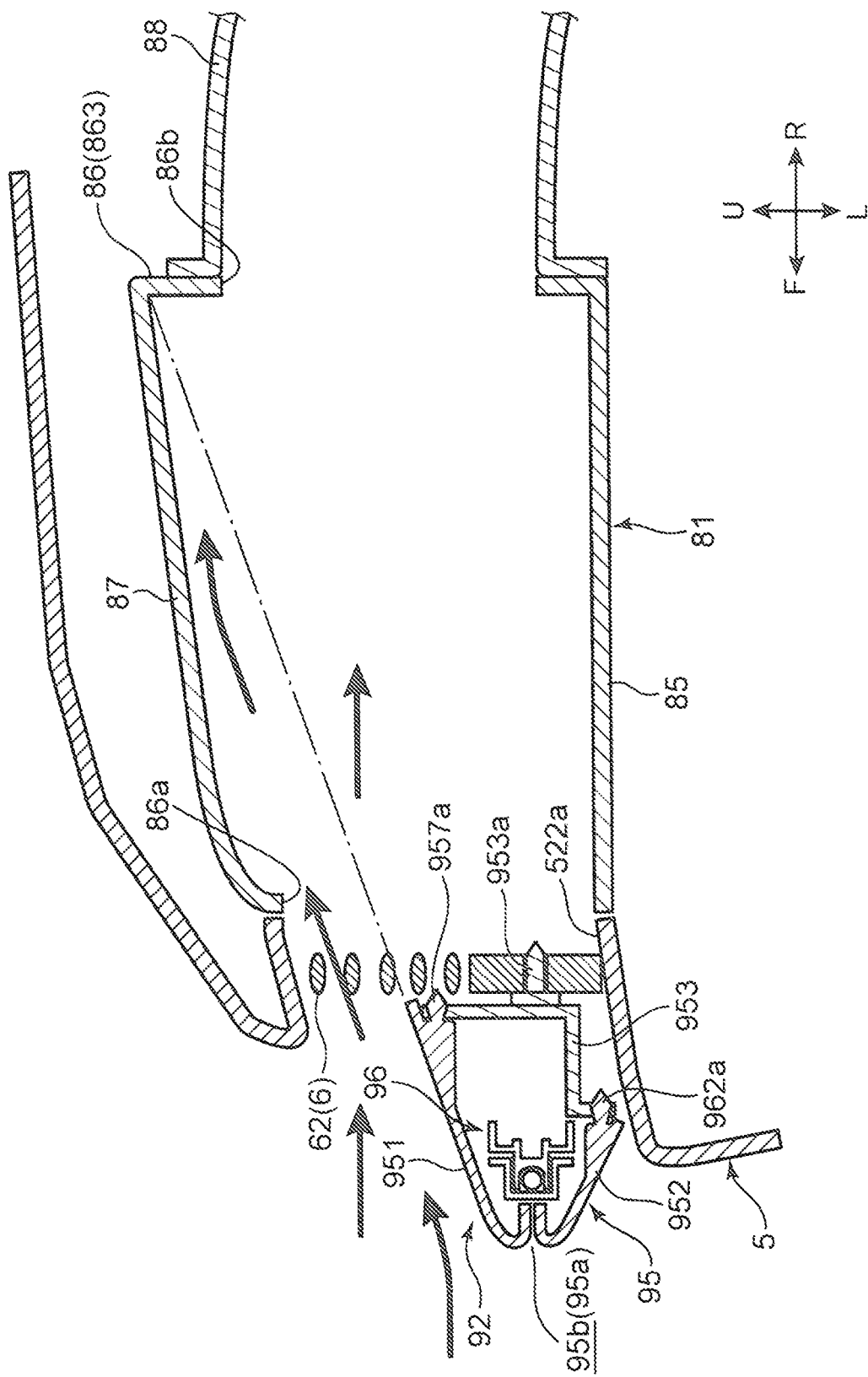
FIG. 8 is a schematic sectional view taken along line VIII-VIII in FIG. 3.
Figure 9:
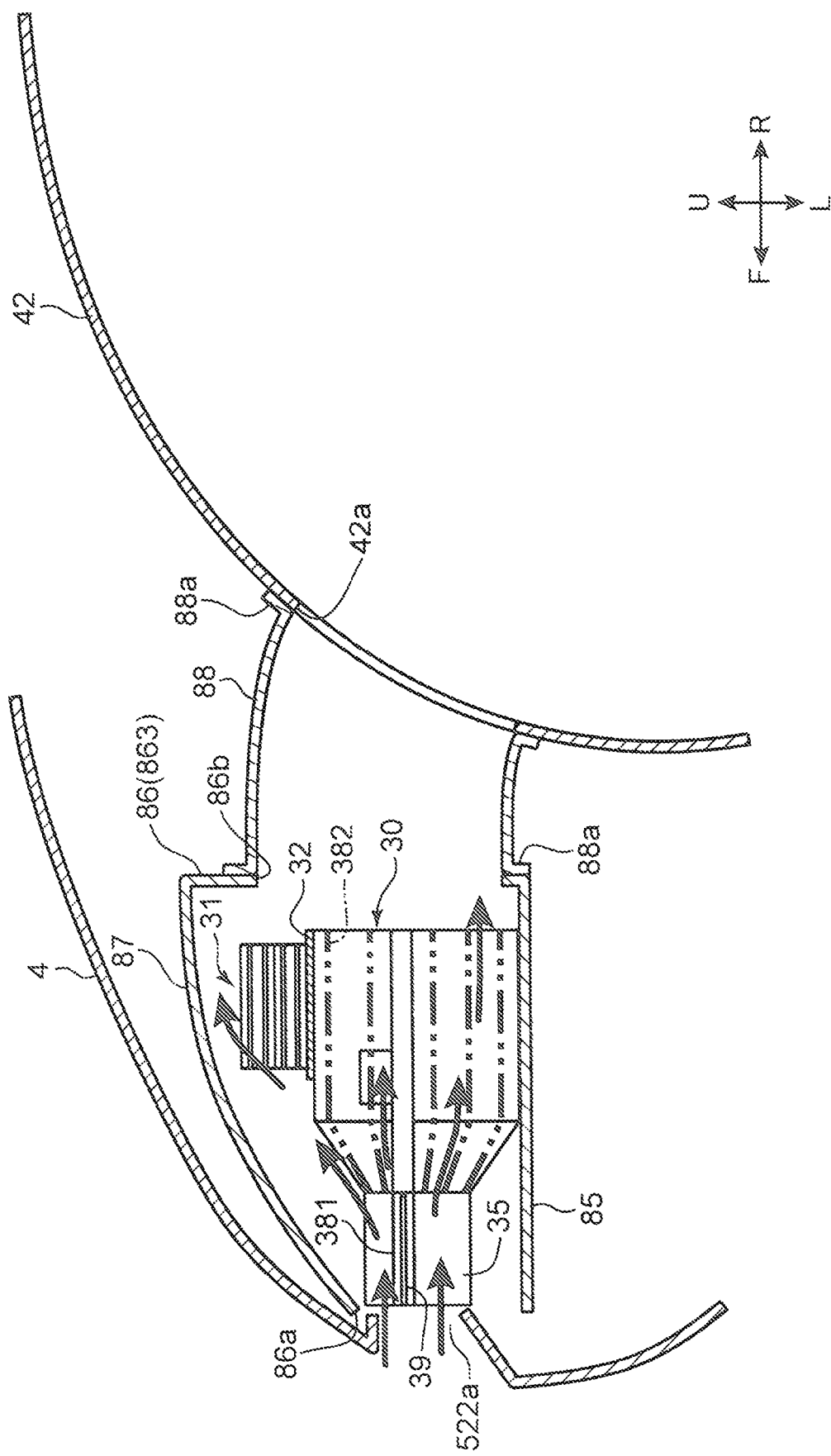
FIG. 9 is a schematic sectional view taken along line IX-IX in FIG. 3.

FIG. 6 is a schematic sectional view taken along line VI-VI in FIG. 2, and FIG. 7 is a schematic sectional view taken along line VII-VII in FIG. 6. FIGS. 8 and 9 are schematic sectional views taken along lines VIII-VIII and IX-IX in FIG. 3, respectively.

Specifically, the lamp unit 8 disposed on the left side in the vehicle width direction includes a housing 81, and a lamp main body 82 housed in the housing 81, and is disposed such that a front face of the lamp main body 82 is exposed from the front side opening portion 522a of the fascia base 5 in a front view as shown in FIGS. 1 and 2.

<<Housing 81>>

The housing 81 is a box-shaped body opened forward and opened rearward and is configured to be capable of cooling the lamp main body 82 housed therein with running wind flowing through each opening. An overall shape of the housing 81 is configured to be a deformed rectangular solid so as to have a front end edge thereof inclining rearward toward an outer side in the vehicle width direction viewed from the top, as well as having an upper surface inclining upward toward the rear side.

Specifically, the housing 81 includes a bottom wall portion 85, a peripheral side wall 86 standing from an outer peripheral edge of the bottom wall portion 85 and having front and rear opening portions 86a and 86b which are opened in each of the front and rear directions of the vehicle, an upper wall portion 87 disposed on an upper end of the peripheral side wall 86 and inclining downward toward the front, and the lamp duct 88 communicating with the rear opening portion 86b as shown in FIGS. 6 to 9. The housing 81 is attached to a vehicle body including the fascia base 5, with the front opening portion 86a opposing to the rear of the front side opening portion 522a of the fascia base 5. The housing 81 is set to take in running wind from the front opening portion 86a through the front side opening portion 522a and allows the running wind to flow in the lamp duct 88 through the rear opening portion 86b, thereby cooling the lamp main body 82. In the present embodiment, the housing 81 is largely opened forward with a front side wall of the peripheral side wall 86 omitted, the front wall portion being disposed in the front of the vehicle 1. As a result, the housing 81 is configured to have an opening area of the front opening portion 86*a* larger than an opening area of the rear opening portion 86*b*, thereby taking in more running wind.

The bottom wall portion 85 is configured to have a deformed square shape viewed from the top. The bottom wall portion 85 is configured to have an inclined wall inclining slightly upward toward the widthwise outer side in a front view as shown in FIG. 7.

The peripheral side wall 86 stands along the outer peripheral edge of the bottom wall portion 85. Specifically, the peripheral side wall 86 includes an inner side wall 861 (a right side wall disposed on the right side in FIG. 6) disposed on a widthwise inner side, a widthwise outer side wall 862 (a left side wall disposed on the left side in FIG. 6) disposed on the widthwise outer side, and a rear side wall 863 disposed on a rear side of the vehicle in the longitudinal direction. The peripheral side wall 86 is largely opened in the front portion of the vehicle with the front side wall omitted as described above.

The inner side wall 861 extends generally vertically in the up-down direction of the vehicle 1, and extends in the front-rear direction of the vehicle 1 so as to incline inwardly in the vehicle width direction toward the front and also so as to curve slightly inwardly as shown in FIGS. 6 and 7. Thus inclining the inner side wall 861 inwardly in the vehicle width direction as advancing to the front enables running wind hitting an inner surface of the inner side wall 861 to be guided to the widthwise outer side. This produces an effect of easily guiding running wind to the lamp main body 82 disposed in a position closer to the widthwise outer side in the housing 81 in the lamp unit 8 as will be described later.

Additionally, a front end edge of the inner side wall 861 is disposed in the rear of the center grille 61 of the front grille 6, making the front opening portion 86*a* be adjacent to the front grille opening portion 5*a* in the vehicle width direction. The configuration of the inner side wall 861 results in a larger width of the front opening portion 86*a* than that of the rear side wall 863 (or the rear opening portion 86*b*), thereby enabling running wind to be taken much more. The inner side wall 861 is larger in the front-rear direction of the vehicle 1 than the outer side wall 862, so that the opening of the front opening portion 86*a* recedes rearward as advancing to the widthwise outer side.

The outer side wall 862 is disposed to extend generally vertically in the up-down direction of the vehicle 1, to extend generally straight along the front-rear direction with respect to the front-rear direction of the vehicle 1, and to be generally opposed to the inner side wall 861 in the vehicle width direction as shown in FIGS. 6 and 7. A length size of the outer side wall 862 in the front-rear direction is set according to a length size of the lamp main body 82, specifically, is set to be shorter than the length size of the lamp main body 82.

The rear side wall 863 is disposed to extend from a rear end edge of the inner side wall 861 to a rear end edge of the outer side wall 862 in the width direction of the vehicle 1 as shown in FIG. 6, and in the present embodiment, is disposed to be generally along the vehicle width direction. The rear side wall 863 extends generally vertically in the up-down direction of the vehicle 1, and is set to have a height size thereof larger than a height size of the front opening portion 86*a*, so that a rear end portion of the lamp main body 82 which is relatively bulky can be housed in the housing 81 as shown in FIGS. 8 and 9.

The rear side wall 863 has the rear opening portion 86*b* penetrating in the front-rear direction. The rear opening portion 86*b* is configured to have a generally rectangular shape in a front view as shown in FIG. 7, and in the present embodiment, a widthwise outer edge of the rear opening portion 86*b* is disposed near to the outer side wall 862. The rear opening portion 86*b* is provided to overlap the front opening portion 86*a* in a front view, and at least a part of the lamp main body 82 is disposed in the overlap range as will be described later.

The upper wall portion 87 is connected to upper ends of the respective side walls 861 to 863 on the inner side, the outer side, and the rear side to close an upper part of a space surrounded by these side walls 861 to 863. The upper wall portion 87 is provided to incline downward toward the front as described above. In detail, the upper wall portion 87 is disposed to be curved downward toward the front according to inclination of the engine hood 3, and to descend forward, so that the upper wall portion 87 in its entirety inclines downward toward the front as shown in FIGS. 8 and 9. Thus, disposing the upper wall portion 87 to descend forward leads to rearward expansion of an internal space of the housing 81 in the up-down direction, thereby facilitating housing of the lamp main body 82. The upper wall portion 87 is set to have a different forward-descending inclination manner according to a position thereof in the vehicle width direction, and is set to have an inclination angle thereof increasing as the upper wall portion 87 comes closer to the lamp main body 82 as shown in FIGS. 8 and 9.

The lamp duct 88 is configured to have a generally cylindrical shape with connection flanges 88*a* at front and rear end portions. The front end portion of the lamp duct 88 is joined, at the connection flange 88*a*, to the rear side wall 863 of the lamp unit 8 so as to cover the rear opening portion 86*b* as clearly shown in FIGS. 8 and 9. On the other hand, the rear end portion of the lamp duct 88 is joined, at the connection flange 88*a*, to the front fender liner 42 of the front fender 4 so as to cover the upper fender opening portion 42*a* as clearly shown in FIG. 8.

<<Lamp Main Body 82>>

Figure 10:
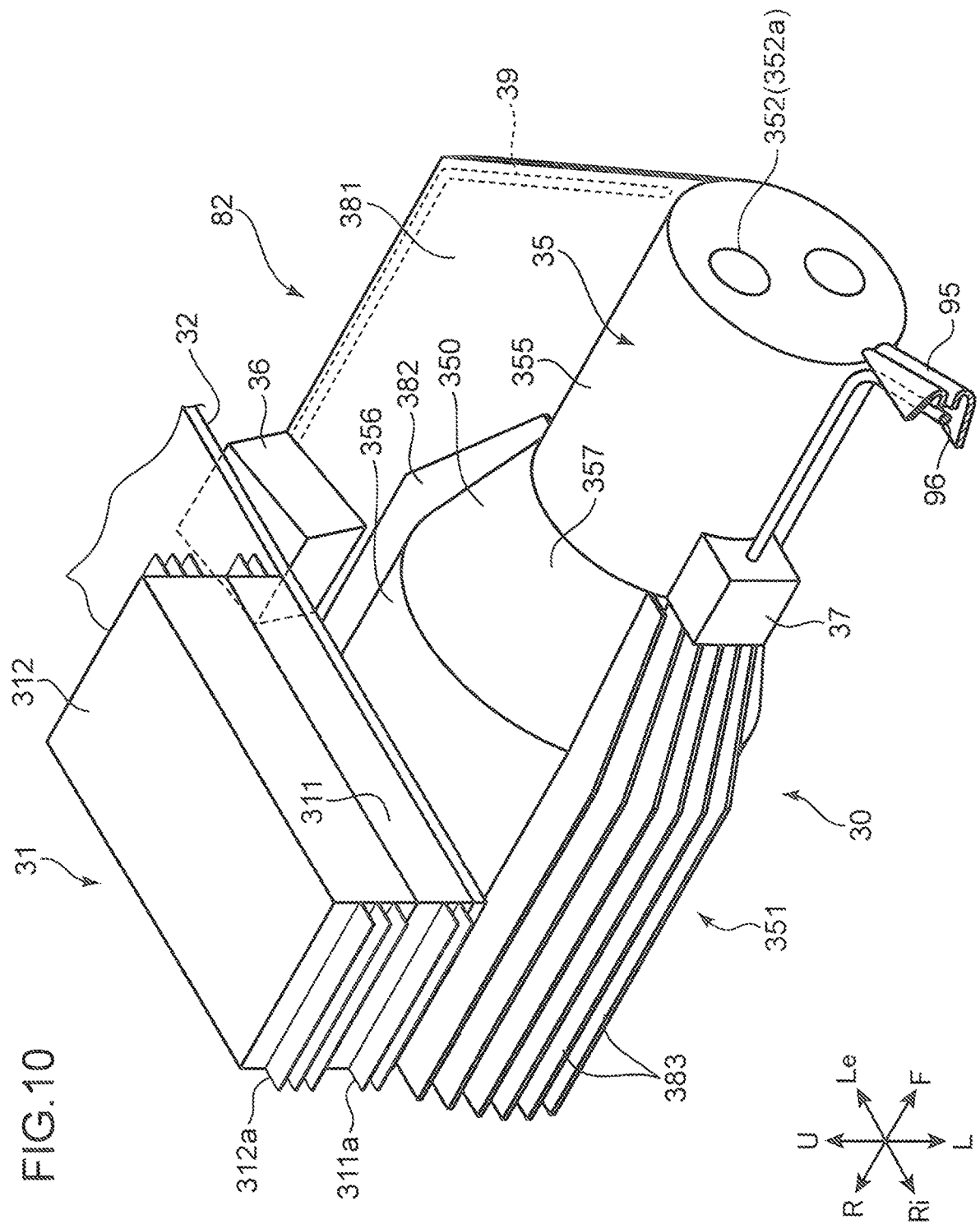
FIG. 10 is a schematic perspective view of a lamp main body.

Next, the lamp main body 82 will be described. FIG. 10 is a schematic perspective view of the lamp main body 82. The lamp main body 82 of the present embodiment has both functions of a head lamp function and a turn lamp function as described above. The lamp main body 82 is disposed in a position closer to the widthwise outer side in the internal space of the housing 81.

Specifically, the lamp main body 82 includes a light emitting portion 30 having various light emitting sources such as a head lamp and a turn lamp, an auxiliary light emitter 31 disposed above a rear portion of the light emitting portion 30, and a stay 32 interposed between the light emitting portion 30 and the auxiliary light emitter 31 to attach the light emitting portion 30 and the auxiliary light emitter 31 to the housing 81. The lamp main body 82 is attached being housed in the housing 81 by fixing the stay 32 to an inner surface of the outer side wall 862 of the housing 81, with the light emitting portion 30 or the auxiliary light emitter 31 being fixed to upper and lower surfaces of the stay 32, respectively. A maximum height size of the lamp main body 82 is larger than the height size of the front opening portion 86*a* as clearly shown in FIG. 8, and therefore, an upper end portion of the lamp main body 82, in detail, at least the auxiliary light emitter 31 is disposed immediately below the upper wall portion 87 and disposed at a position higher than an upper end of the front opening portion 86*a*.

The light emitting portion 30 has light sources of a head lamp and a turn lamp, the turn lamp being disposed on each of the inner side and outer side of the head lamp in the vehicle width direction and being provided with each light source. Specifically, the light emitting portion 30 includes the cylinder head lamp 35 having a columnar shape extending in the front-rear direction, an outer side turn lamp light source portion 36 attached to a widthwise outer side portion of the cylinder head lamp 35, and an inner side turn lamp light source portion 37 attached to an inner side portion of the cylinder head lamp 35. The light emitting portion 30 is set to emit linear light toward the front, the light being emitted from the inner and outer side turn lamp light source portions 36 and 37 and being guided by inner side and outer side turn lamp light guide bodies 96 and 39 to be described later (corresponding to an inner side turn lamp light emitter and an outer side turn lamp light emitter, respectively) extending linearly along inward and outward directions of the cylinder head lamp 35 in the vehicle width direction.

The cylinder head lamp 35 is configured as follows. A head lamp light source 352 is allowed to illuminate the front and is housed in a lamp case 350 (corresponding to a main body case) which has a tubular shape, is disposed to have an axis along the front-rear direction, and is opened forward. A front opening of the lamp case 350 is closed by a lamp lens 353 (see FIG. 7). The cylinder head lamp 35 is configured to be turnable in the right-left direction centered around a rotation shaft 354 having an axis in a vertical direction within a predetermined angle by an adaptive front-lighting system actuator (AFS actuator) 311 to be described later as shown in FIG. 7. The lamp case 350 is integrally molded out of a metal material. The lamp case 350 is provided with an intermediate slope portion 357 which has a rear portion 356 with a diameter larger than that of a front portion 355 and connects the front portion 355 and the rear portion 356 so as to have a slope. The head lamp light source 352 housed in the lamp case 350 is configured with an LED in the present embodiment, specifically, has a plurality of point light sources 352a and a plurality of ring light sources (not shown). The lamp lens 353 is attached to a front end of the lamp case 350 to diffuse light emitted from the head lamp light source 352 upward, downward, rightward, and leftward.

The cylinder head lamp 35 further has a heat dissipation portion 351. The heat dissipation portion 351, which is integrally provided so as to protrude from the lamp case 350, is configured to discharge heat generated from the cylinder head lamp 35 and the turn lamp light source portions 36 and 37 into air. In particular, the heat dissipation portion 351 is configured to have heat dissipation efficiency more excellent in a widthwise outer side portion of the lamp case 350 than in a widthwise inner portion thereof.

Specifically, the heat dissipation portion 351 includes a first outer side heat dissipation fin 381 (corresponding to an outer side heat dissipation portion) provided across an entire length of the lamp case 350 to protrude to the widthwise outer side, a plurality of second outer side heat dissipation fins 382 extending from the intermediate slope portion 357 to the rear portion 356 of the lamp case 350 and protruding radially to the widthwise outer side, and a plurality of inner side heat dissipation fins 383 (corresponding to an inner side heat dissipation portion) extending from the intermediate slope portion 357 to the rear portion 356 of the lamp case 350 and radially protruding to the widthwise inner side, the heat dissipation portion 351 being made of a metal material such as aluminum and integrally provided with the lamp case 350. A total sum of a surface area of the first outer side heat dissipation fin 381 and surface areas of the second outer side heat dissipation fins 382 is set to be larger than a total sum of surface areas of the inner side heat dissipation fins 383.

The first outer side heat dissipation fin 381 protrudes so as to incline slightly upward from substantially a vertically center position of the widthwise outer side of the lamp case 350 as advancing to the widthwise outer side. The protrusion direction in the present embodiment is set to be on an extension line of a ridgeline 95a of a colored decoration wing 95 (see FIG. 5) to be described later. Protrusion from the lamp case 350 is set to be larger than protrusion of the inner side heat dissipation fins 383, for example, to be 1.5 times to 3 times protrusion of the inner side heat dissipation fins 383. The first outer side heat dissipation fin 381 is also configured to be a plate-shaped body which extends longer in the front-rear direction than the inner side heat dissipation fins 383, in detail, is configured to extend from a front end to a rear end of the lamp case 350. As a result, the surface area of the first outer side heat dissipation fin 381 is larger than the surface areas of the inner side heat dissipation fins 383.

A front end surface of the first outer side heat dissipation fin 381 recedes rearward as advancing to the widthwise outer side as shown in FIG. 6. On the front end surface, a recessed portion opened forward (not shown) is provided along the front end surface across a generally entire length thereof, in which recessed portion, the outer side turn lamp light guide body 39 is disposed. In other words, the first outer side heat dissipation fin 381 has the outer side turn lamp light guide body 39.

The outer side turn lamp light guide body 39 is configured to be a linear guide body such as an optical fiber or an acrylic rod with a light diffusion structure, such as a minute elliptical diffusion lens, provided on the rear side, in which light incident from one end portion is propagated to the other end portion so as to be emitted forward. The outer side turn lamp light guide body 39 has one end portion connected to the outer side turn lamp light source portion 36 to be capable of receiving light emitted by the outer side turn lamp light source portion 36 of the light emitting portion 30 and is laid along an outer side surface of the first outer side heat dissipation fin 381, as well as being laid along the recessed portion provided in the front end surface, and has the other end portion disposed at a position near to the cylinder head lamp 35 on the widthwise outer side thereof.

Returning to the heat dissipation portion 351, the second outer side heat dissipation fin 382 is configured generally similarly to the inner side heat dissipation fins 383, except for a protrusion direction. The number of the second outer side heat dissipation fins 382 is set to be the same as that of the inner side heat dissipation fins 383. Therefore, the second outer side heat dissipation fins 382 and the inner side heat dissipation fins 383 are generally equal in the entire surface area, and in the present embodiment, because of the first outer side heat dissipation fin 381 provided in the heat dissipation portion 351, a total sum of a surface area of the first outer side heat dissipation fin 381 and the surface areas of the second outer side heat dissipation fins 382 is larger than a total sum of the surface areas of the inner side heat dissipation fins 383, so that an outer side portion of the lamp case 350 has higher heat dissipation efficiency.

The outer side turn lamp light source portion 36 is attached to a rear portion of an upper surface of the first outer side heat dissipation fin 381 and is connected so as to illuminate the one end portion of the outer side turn lamp light guide body 39. On the other hand, the inner side turn lamp light source portion 37 is attached to a widthwise outer side surface of the front portion 355 of the lamp case 350. The turn lamp light source portions 36 and 37 are configured to emit not only orange light but also white light and to perform positioning lamp function on the state that the turn lamp function is not performed.

On the other hand, the auxiliary light emitter 31 is an apparatus associated with the light emitting portion 30 in the present embodiment, includes the AFS actuator 311, and a lamp control portion 312 provided above the AFS actuator 311. These AFS actuator 311 and lamp control portion 312 each have heat dissipation fins 311a and 312a extending in the front-rear direction and ensure heat dissipation performance. The auxiliary light emitter 31 is attached within the housing 81 via the stay 32 and is provided above the cylinder head lamp 35, and therefore in the case that the auxiliary light emitter 31 is housed in the housing 81, the auxiliary light emitter 31 is disposed at a position higher than an upper edge of the front opening portion 86a of the housing 81 as clearly shown in FIG. 9.

The adaptive front-lighting system actuator (AFS actuator) 311 serves to turn an optical axis of the cylinder head lamp 35 according to a steering angle of a steering wheel. Specifically, the AFS actuator 311 has an output shaft 311b which turns according to the steering angle of the steering wheel within a range of a predetermined angle, with the output shaft 311b being attached on an upper surface of the cylinder head lamp 35 so as to have the axis thereof coinciding with the rotation shaft 354 as shown in FIG. 7. This allows the cylinder head lamp 35 to turn around the rotation shaft 354 (or the output shaft 311b).

The lamp control portion 312 is electrically connected to a main computer to control the lamp units 8, specifically, control light emission of the cylinder head lamps 35, and the outer and inner side turn lamp light source portions 36 and 37, as well as controlling the AFS actuator 311. The lamp control portion 312 is set to cause the outer and inner side turn lamp light source portions 36 and 37 to emit not only orange light as turn lamps but also white light as positioning lamps.

<<Assembly of Housing 81 and Lamp Main Body 82>>

The lamp main body 82 is incorporated into the housing 81 thus configured in the following manner to form the lamp unit 8.

Specifically, the lamp main body 82 is attached, inside the housing 81, to the widthwise outer side end portions. Specifically, the lamp main body 82 is attached to the inner surface of the outer side wall 862 of the housing 81 via the stay 32.

In this state, the cylinder head lamp 35 of the lamp main body 82, in more detail, the lamp case 350 is disposed in a position closer to the widthwise outer side of the front opening portion 86a of the housing 81, the position being spaced from a widthwise outer edge of the front opening portion 86a to the widthwise inner side in such a manner as to have a part of the front end portion thereof being exposed from the front opening portion 86a. Additionally, the heat dissipation portion 351 provided to protrude from the lamp case 350 is disposed to be generally positioned within an overlap range between the front opening portion 86a and the rear opening portion 86b of the housing 81 in a front view, with a front end portion of the first outer side heat dissipation fin 381 in the protrusion direction extending to the widthwise outer edge of the front opening portion 86a.

On the other hand, the auxiliary light emitter 31 of the lamp main body 82 is disposed at a position higher than the upper edge of the front opening portion 86a and is upwardly deviated from the above overlap range.

Then, the lamp unit 8 is attached to the vehicle body including the fascia base 5 in the following manner.

Specifically, the front opening portion 86a of the housing 81 of the lamp unit 8 is disposed at the back of the front side opening portion 522a of the fascia base 5, and the housing 81 is attached to the vehicle body including the fascia base 5. Then, the center grille 61 of the front grille 6 is attached to the front grille opening portion 5a, while the extension grille 62 is attached to the front side opening portion 522a, with an outer end portion of the extension grille 62 in the vehicle width direction being disposed near a widthwise inner edge of the cylinder head lamp 35.

In this state, the front end edge of the inner side wall 861 of the housing 81 is disposed adjacent to the front grille opening portion 5a as shown in FIG. 6, and therefore, a widthwise inner edge of the front opening portion 86a of the housing 81 is also adjacent to the front grille opening portion 5a. Additionally, the lamp main body 82 disposed at an eccentric position in the housing 81 is disposed at a position spaced from the front grille opening portion 5a of the fascia base 5 in the vehicle width direction.

<<Decoration Member 9>>

Next, the decoration member 9 will be described.

The decoration member 9 protrudes forward from the fascia base 5 to decorate the front portion of the vehicle 1 in three dimensions. The decoration member 9, in its entirety, is formed to have a flat reverse omega shape and is attached to the front grille 6 while straddling between the cylinder head lamps 35 of the right and left lamp units 8 as shown in FIG. 2. Specifically, the decoration member 9 decorates spaces between the both cylinder head lamps 35 and the front grille opening portion 5a at the same height as that of the cylinder head lamps 35 in three dimensions. In addition to the decoration function, the decoration member 9 has both end portions in the vehicle width direction, and functions as a turn lamp, and functions as an air flow guide portion (rectifier plate) which rectifies running wind introduced into the lamp units 8.

Specifically, the decoration member 9 includes a grille frame portion 91 disposed along an outer peripheral edge of the front grille opening portion 5a of the fascia base 5, and has a U-shape, and a pair of right and left wing frame portions 92 extending from an upper end portion of the grille frame portion 91, the upper end portion being both end portions in the vehicle width direction, along the front side opening portion 522a (or the inclined side portions 52) of the fascia base 5. The grille frame portion 91 and the wing frame portions 92 are coated with similar colors to be finished to have a feeling of unity in its entirety in the present embodiment.

The grille frame portion 91 protrudes forward from the fascia base 5 as shown in FIG. 4, specifically, to have a section thereof orthogonal to an extension direction which protrudes forward to exhibit a generally triangular shape. The grille frame portion 91 includes a pair of longitudinal frame portions 911 extending along both widthwise side edges of the front grille opening portion 5a, and a cross frame portion 912 linking lower ends of these longitudinal frame portions 911, the frame portions 911 and 912 being disposed to conceal a boundary part between the center grille 61 and the edge portion of the front grille opening portion 5a as shown in FIG. 2. The longitudinal frame portions 911 inclines downward as advancing to the widthwise inner side, and the cross frame portion 912 linking the lower ends of the vertical frame portions 911 inclines downward as advancing to the widthwise center position, thereby exhibiting a flat U-shape as described above as a whole of the grille frame portion 91. As shown in FIG. 4, a front end top of the cross frame portion 912 is positioned forward of the front end top of the vertical frame portion 911.

The wing frame portion 92 has a vertical section protruding forward to exhibit a generally triangular shape as shown in FIG. 8. The wing frame portion 92 is disposed ahead of the front opening portion 86*a* of the housing 81 in the lamp unit 8, in detail, a rear end portion of the wing frame portion 92 is located within the front side opening portion 522*a* and a front end top thereof is disposed to protrude forward from the fascia base 5.

Specifically, the wing frame portion 92 is provided along the extension grille 62 (or the front side opening portion 522*a*) of the front grille 6 to exhibit a generally wing shape viewed from the top as shown in FIG. 3. Specifically, the wing frame portion 92 viewed from the top has a deformed pentagonal shape having a rear end edge 92*a* extending obliquely along the extension grille 62, a front end edge 92*b* extending in the right-left direction from a front end of the rear end edge 92*a* toward the widthwise outer side, a first inclined front end edge 92*c* extending short while receding rearward from a widthwise outer end of the front end edge 92*b* as advancing to the widthwise outer side, a second inclined front end edge 92*d* longer than the first inclined front end edge 92*c* and further inclining from a widthwise outer end of the first inclined front end edge 92*c*, and a third inclined front end edge 92*e* shorter than the second inclined front end edge 92*d* and further inclining from a widthwise outer end of the second inclined front end edge 92*d*. Among these outer peripheral edges of the wing frame portion 92, the front end edge 92*b* is disposed ahead of the center face portion 51 of the fascia base 5, the first inclined front end edge 92*c* is disposed ahead of the side wall main body 521 of the fascia base 5, and the second inclined front end edge 92*d* is disposed ahead of the side upper wall 522 of the fascia base 5. The front end edge 92*b* of the wing frame portion 92 is disposed most forward, at the same height, of the vehicle 1 except for the emblem 63.

As shown in FIG. 2, the wing frame portion 92 extends in the vehicle width direction from the front grille opening portion 5*a* (in detail, an upper end portion of the front grille opening portion 5*a* on the widthwise outer side) to the cylinder head lamp 35 (in detail, the widthwise inner edge of the cylinder head lamp 35) of the lamp main body 82, and has, in addition to the decoration function of decorating the parts from the front grille opening portion 5*a* to the lamp main body 82 in three dimensions, the function as a turn lamp, and the function of rectifying running wind introduced into the lamp unit 8.

Figure 11:
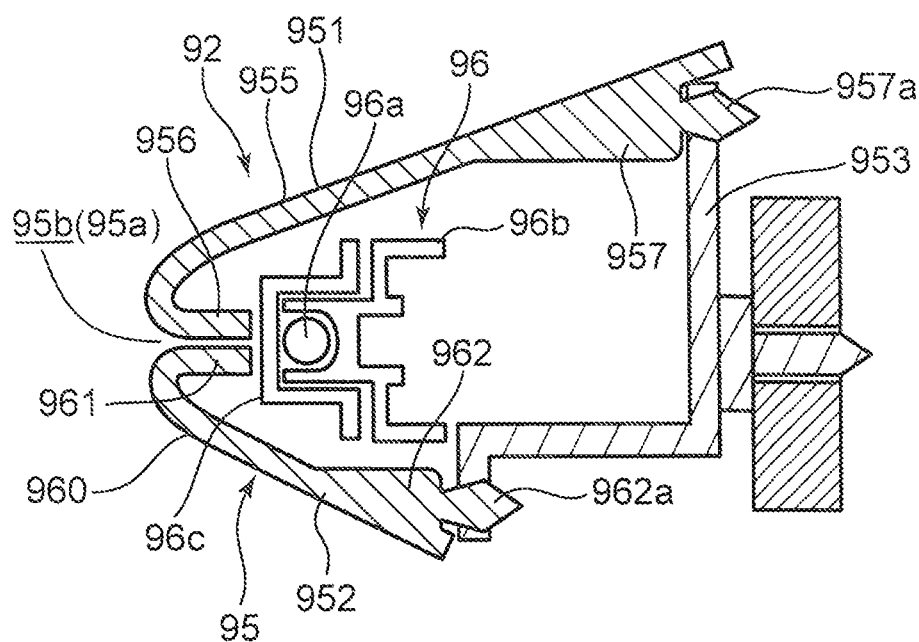
FIG. 11 is an enlarged sectional view showing a wing frame portion in FIG. 8.

Specifically, as clearly shown in FIG. 11, the wing frame portion 92 includes the colored decoration wing 95 (corresponding to a colored decoration main body) colored with metallic color or the like and having a generally triangular shaped-skin protruding forward, and the inner side turn lamp light guide body 96 provided, in the colored decoration wing 95, along the ridgeline 95*a* (see FIG. 5) linking a front end top of the colored decoration wing 95, and is configured to rectify running wind by the colored decoration wing 95, and to emit light including turn lamp light forward by the inner side turn lamp light guide body 96.

The colored decoration wing 95 is a skin member mainly governing an overall shape of the wing frame portion 92. The colored decoration wing 95 is formed from a hard material such as a synthetic resin material or a metal material and is configured as a non-transparent body with a colored surface coated in metallic color (non-light transmission body) in the present embodiment. The colored decoration wing 95 is configured to be divided into upper and lower parts via a light emission gap 95*b*, with the ridgeline 95*a* extending widthwise outwardly in a front view as a boundary. The colored decoration wing 95 is provided to incline upward as advancing to the widthwise outer side in a front view as shown in FIG. 2. As a result, the ridgeline 95*a* in the widthwise outer side portion extends linearly upward and toward the widthwise outer side, and the front end surface of the first outer side heat dissipation fin 381 of the lamp main body 82 is disposed on the extension line of the ridgeline 95*a* (see FIG. 5). In other words, the outer side turn lamp light guide body 39 of the lamp main body 82 extends on the extension line of the ridgeline 95*a*. As a result, the inner side turn lamp light guide body 96 and the outer side turn lamp light guide body 39 are disposed linearly on the inner side and outer side of the cylinder head lamp 35 in the vehicle width direction with the cylinder head lamp 35 interposed therebetween, thereby obtaining design with a feeling of unity. The ridgeline 95*a* is a line linking the front end top of the colored decoration wing 95.

Specifically, the colored decoration wing 95 includes an upper wing portion 951 forming the divided upper part, a lower wing portion 952 disposed below the upper wing portion 951 via the light emission gap 95*b* extending in the vehicle width direction, and a bracket 953 for attaching these upper wing portion 951 and lower wing portion 952 to the extension grille 62, the colored decoration wing 95 being attached to a front face of the extension grille 62 via the bracket 953 as shown in FIG. 11.

The upper wing portion 951, including an upper inclined wall 955 inclining upward as advancing to the rear side to guide running wind upward obliquely, an upper folded piece 956 folded from a front end edge of the upper inclined wall 955 to extend toward the rear side, and a bracket attachment portion 957 provided to protrude on a bottom surface of a rear end portion of the upper inclined wall 955, is configured to rectify running wind by an upper surface of the upper inclined wall 955 to guide the running wind to an internal upper space of the lamp unit 8.

The upper inclined wall 955 is configured to have a flat plate shape and has the upper surface inclining upward as advancing to the rear side. An inclination angle of the upper inclined wall 955 to the front-rear direction is set such that running wind is guided to an upper part of the internal space in the housing 81 of the lamp unit 8. Specifically, the inclination angle is set such that an extension line of the upper surface of the upper inclined wall 955 passes an upper edge of the front side opening portion 522*a* of the fascia base 5 or a position lower than the upper edge and is also set such that the extension line passes the upper edge of the front opening portion 86*a* of the lamp unit 8 or a position lower than the upper edge. The inclination angle is preferably set such that the extension line crosses the upper wall portion 87 of the housing 81. Although the inclination angle is set to be constant across the entire length of the upper wing portion 951 (the length in the extension direction) in the present embodiment, the inclination angle may be changed according to a position of the upper inclined wall 955 in the vehicle width direction, the position being changed due to twist with the extension direction as an axis. Even when the inclination angle of the upper inclined wall 955 is thus changed, the inclination angle of the upper inclined wall 955, in any part in the extension direction, is preferably allowed to guide running wind to the upper part of the housing 81 and is preferably to be set, at least near the lamp main body 82, such that the extension line of the upper inclined wall 955 crosses the upper wall portion 87.

The lower wing portion 952 includes a lower inclined wall 960 inclining downward as advancing to the rear side, a lower folded piece 961 folded from a front end edge of the lower inclined wall 960 to extend toward the rear side, and a bracket attachment portion 962 provided to protrude on an upper surface of a rear end portion of the lower inclined wall 960. An inclination angle of the lower inclined wall 960 to the front-rear direction, which is to be changed with respect to the vehicle width direction, is set to become smaller as advancing to the widthwise outer side. Therefore, the lower wing portion 952 functions also as a rectifier plate which guides running wind downward in a widthwise outer side end portion of the lower inclined wall 960. In the present embodiment, the lower wing portion 952 is molded integrally with the grille frame portion 91.

The upper wing portion 951 and the lower wing portion 952 are attached to the bracket 953 as a result of forced insertion of protruding bosses 957a and 962a of the bracket attachment portions 957 and 962 into respective attachment holes of the bracket 953. In this state, the upper folded piece 956 of the upper wing portion 951 and the lower folded piece 961 of the lower wing portion 952 are disposed spaced apart via the light emission gap 95b. The light emission gap 95b extends along the ridgeline 95a and is preferably set to have a size smaller than a height size of the wing frame portion 92 as clearly shown in FIG. 5. In other words, a width size of the light emission gap 95b is preferably set within a range of 1 mm to 10 mm. With the width size smaller than 1 mm, a sufficient amount of light cannot be emitted through the light emission gap 95b, and on the other hand, with the width size larger than 10 mm, presence of the light emission gap 95b may deteriorate designability. In view of this point, the width size of the light emission gap 95b is further preferably set within a range of 1 mm to 5 mm.

In an internal space of the wing frame portion 92, the inner side turn lamp light guide body 96 is laid. Specifically, the inner side turn lamp light guide body 96 is disposed between the upper inclined wall 955 of the upper wing portion 951 and the lower inclined wall 960 of the lower wing portion 952, and backward of rear end edges of the folded pieces 956 and 961 as shown in FIG. 8. The inner side turn lamp light guide body 96 is long and has flexibility, and is laid along the front end top (the ridgeline 95a) of the wing frame portion 92 when viewed from the top as shown in FIG. 6.

The inner side turn lamp light guide body 96 includes a light guide base 96a which is long and receives, at one end portion thereof, light from the inner side turn lamp light source portion 37 and transmits the received light to the other end portion while illuminating the front, a light emission housing 96b which houses the light guide base 96a, and a cover lens portion 96c attached to a front surface of the light emission housing 96b, has flexibility, is disposed along the ridgeline 95a of the colored decoration wing 95, and is attached to the colored decoration wing 95 at an appropriate position in a longitudinal direction of the inner side turn lamp light guide body 96 as shown in FIG. 11.

The light guide base 96a has flexibility as well as light guiding property and can be disposed in a curved state. The light guide base 96a is configured such that a part disposed along the ridgeline 95a is allowed to emit light to the front side direction of the vehicle 1, in the direction orthogonal to the ridgeline 95a, the light being transmitted in the longitudinal direction, and is configured to illuminate the front side by a known manner such as forming a light emission pattern of an ellipsoidal lens by the light guide base 96a whose rear face side is cut into a flat shape. The light emission housing 96b is recessed rearward in a plane perpendicularly intersecting the longitudinal direction, and the light guide base 96a is disposed in the recessed portion, as shown in FIG. 11. The cover lens portion 96c is attached so as to cover the recessed portion of the light emission housing 96b from the front, thereby enabling light emission from the light guide base 96a to be diffused upward, downward, rightward and leftward.

Specifically, the inner side turn lamp light guide body 96 is disposed along the front end edges 92b to 92e of the wing frame portion 92, with a rear end portion thereof being disposed at an illumination position of the inner side turn lamp light source portion 37 of the lamp main body 82 and being connected to receive light illuminated from the inner side turn lamp light source portion 37 as shown in FIG. 6. In other words, the wing frame portion 92 is set to linearly emit light through the light emission gap 95b of the ridgeline 95a of the colored decoration wing 95 by the inner side turn lamp light guide body 96.

<<Assembly of Decoration Member 9 and Front Grille 6>>

The decoration member 9 thus configured is attached to the front grille 6. Specifically, the grille frame portion 91 of the decoration member 9 is attached to the center grille 61 of the front grille 6. In this attachment state, the grille frame portion 91 is disposed to straddle, across generally entire length thereof, the center grille 61 and a peripheral edge portion of the front grille opening portion 5a of the fascia base 5, and to hide a boundary thereof in a front view.

On the other hand, the wing frame portion 92 of the decoration member 9 is attached to the extension grille 62 by fitting an attachment boss portion 953a of the bracket 953 into an appropriate part of the extension grille 62 of the front grille 6 as shown in FIG. 8. In this attachment state, the wing frame portion 92 is generally disposed forward of the fascia base 5, with the front end edges 92b to 92e being maintained at the height thereof, and the inner side turn lamp light guide body 96 emits light through the light emission gap 95b in each of the front end edges 92b to 92e as shown in FIG. 6. The wing frame portion 92 is disposed ahead of the front opening portion 86a of the housing 81 of the lamp unit 8, such that running wind is guided to the upper part of the internal space of the housing 81 as the vehicle 1 runs.

Function and Effect

With the foregoing described front structure of the vehicle 1 according to the present embodiment, since the lamp unit 8 includes the housing 81 including the peripheral side wall 86 having the front and rear opening portions 86a and 86b which are opened in the front and rear directions of the vehicle 1, and the lamp main body 82 housed in the housing 81, when the vehicle 1 runs, an air flow is generated over the front opening portion 86a and the rear opening portion 86b by running wind as the vehicle runs, so that the lamp main body 82 can be cooled by the air flow. Since the lamp main body 82, specifically, the cylinder head lamp 35 extends in the front-rear direction in a position closer to the widthwise outer side of the front opening portion 86a, the position being spaced from the widthwise outer edge of the front opening portion 86a to the widthwise inner side, the front can be effectively illuminated. Moreover, the arrangement of the cylinder head lamp 35 makes the cylinder head lamp 35 at a position spaced from the center grille 61 in the vehicle width direction, and renders a part therebetween to be decorated by the decoration member 9. Thus, the front portion of the vehicle 1 can be obtained with an improved design.

Additionally, the cylinder head lamp 35 (in more detail, the lamp case 350) is provided with the heat dissipation portion 351. In the heat dissipation portion 351, the first outer side heat dissipation fin 381 protrudes greater from the lamp case 350 and is larger in the front-rear direction as compared with the inner side heat dissipation fins 383. Accordingly, the surface area becomes larger as compared with the inner side heat dissipation fins 383. This makes it possible to compensate for a difference in a flow rate of running wind between the widthwise inner side and the widthwise outer side of the cylinder head lamp 35. Therefore, the reduced difference in the cooling efficiency between the widthwise inner and outer side portions of the lamp main body 82 enables the lamp main body 82 to be efficiently cooled. Moreover, since the first outer side heat dissipation fin 381 is formed of a metal material with a relatively high thermal conductivity such as aluminum and molded integrally with the lamp case 350, heat can be transmitted efficiently from the lamp case 350.

Further, in the present embodiment, since the wing frame portion 92 of the decoration member 9 extends from the front grille opening portion 5a to the cylinder head lamp 35 of the lamp main body 82, and the front end surface of the first outer side heat dissipation fin 381 extends on the extension line of the ridgeline 95a of the colored decoration wing 95 with the cylinder head lamp 35 interposed therebetween in a front view (see FIG. 5), the first outer side heat dissipation fin 381 can be perceived integrally with the decoration member 9 in terms of design, thereby enabling the front portion of the vehicle 1 to have clean and sophisticated design. Moreover, since the first outer side heat dissipation fin 381 is provided to incline backward of the vehicle 1 toward the widthwise outer side, the front portion of the vehicle 1 can be decorated in three dimensions in combination with the presence of the inclined side portions 52 of the fascia base 5 and the decoration member 9 protruding forward from the fascia base 5.

In addition, since the inner side turn lamp light guide body 96 is provided along the ridgeline 95a and the outer side turn lamp light guide body 39 is provided along the front end surface of the first outer side heat dissipation fin 381, turn lamps (or positioning lamps) linearly disposed with the cylinder head lamp 35 round in a front view interposed therebetween are allowed to emit light, thereby obtaining more functionally sophisticated design with a feeling of unity to the front portion of the vehicle 1.

Modifications

The foregoing described vehicle 1 and front structure thereof are one embodiment of the present invention, and a specific configuration thereof can be appropriately changed without departing from the gist of the present invention. Modifications will be described in the following.

(1) Although the above embodiment has been described with respect to a case where the cylinder head lamp 35 is provided with the single first outer side heat dissipation fin 381, a plurality of first outer side heat dissipation fins protruding largely may be provided. Large numbers of groove portions extending in the front-rear direction on both upper and lower surfaces of the first outer side heat dissipation fin 381 may be arranged in the protrusion direction. Such configuration enables further expansion of the surface area of the first outer side heat dissipation fin 381.

(2) Although in the above embodiment, the first outer side heat dissipation fin 381 inclines slightly upward as advancing to the widthwise outer side to protrude from the lamp case 350 in a front view, the protrusion direction is not particularly limited as long as the protrusion is directed to the widthwise outer side, and may be a protrusion, for example, along the vehicle width direction.

However, it is preferable to give a feeling of unity in design with the decoration member 9 by providing the first outer side heat dissipation fin 381 on the extension line of the ridgeline 95a of the wing frame portion 92 (the colored decoration wing 95), and in such a case where the first outer side heat dissipation fin 381 is provided to protrude along the vehicle width direction as described above, the first outer side heat dissipation fin 381 is preferably configured to extend in the vehicle width direction over a predetermined range of widthwise outer end portions on the ridgeline 95a of the wing frame portion 92.

(3) Although in the above embodiment, the light guide bodies 96 and 39 are used as inner side and outer side turn lamp light emitters, a light source body which emits light on its own may be used in place of these light guide bodies. Specifically, point light sources of LED can be arranged as inner side turn lamp light emitters on a line or surface light sources such as organic EL disposed in a band can be used. Such a light source portion to be provided may conduct not only direct light emission but also indirect light emission.

Additionally, in the case that point light sources are used as inner side and outer side turn lamp light emitters, the inner side and outer side turn lamp light emitters can be sequentially lighted up to be chained light-up, thereby further enhancing togetherness.

Summary of Invention

The front structure for a vehicle according to the present invention includes lamp units provided in widthwise both end portions of a front portion of the vehicle, and each of the lamp units provided with a housing including a peripheral side wall having a front opening portion opened toward the front of the vehicle and a rear opening portion opened toward the rear of the vehicle, and a lamp main body disposed in the housing, the lamp main body including a main body case extending in a longitudinal direction of the vehicle in a position closer to a widthwise outer side of the front opening portion, and spaced away from a widthwise outer edge of the front opening portion toward a widthwise inner side, and inner side heat dissipation portion and the outer side heat dissipation portion protruding from the main body case to the inner side and the outer side in the vehicle width direction, the outer side heat dissipation portion protruding greater than the inner side heat dissipation portion.

According to the present invention, since the lamp unit includes the housing including the peripheral side wall having opening portions on the front and rear sides which are opened toward the front and the rear of the vehicle, and the lamp main body including the main body case, and the inner side heat dissipation portion and the outer side heat dissipation portion, an air flow generates from the front opening portion to the rear opening portion as the vehicle runs, so that the lamp main body can be cooled by the air flow. Additionally, since the main body case extends in the longitudinal direction of the vehicle in the position closer to the widthwise outer side of the front opening portion, and spaced away from the widthwise outer edge of the front opening portion toward the widthwise inner side, the running front can be effectively illuminated and the front portion of the vehicle can be imparted with an improved design. Moreover, since the outer side heat dissipation portion protrudes greater than the inner side heat dissipation portion, the surface area of the outer side heat dissipation portion becomes larger to make it possible to compensate for the difference in the flow of running wind between the widthwise inner side and the widthwise outer side of the main body case. Therefore, the reduced difference in the cooling efficiency between the widthwise inner side portion and the widthwise outer side portion of the main body case makes it possible to cool the lamp main body more effectively in its entirety.

Although the present invention does not limit the shape of the outer side heat dissipation portion to a particular one as long as the portion is a protrusion body such as a rod-shaped protrusion body, a pin-shaped protrusion body, a block-shaped protrusion body, the outer side heat dissipation portion is preferably a heat dissipation plate having the shape of a plate which protrudes toward the widthwise outer side as well as extending in the longitudinal direction of the vehicle.

This configuration which has the heat dissipation plate extending in the front-rear direction of the vehicle makes a greater difference in the surface area between the inner and outer heat dissipation portions.

In this case, the heat dissipation plate is not particularly limited to a specific configuration. The heat dissipation plate may be provided in a part of the main body case in an extension direction or may be provided separately from the main body case, and preferably extends from a front end to a rear end of the main body case integrally with the main body case.

This configuration makes a greater difference in the surface area between the inner and outer heat dissipation portions, and enables heat of the main body case to be more efficiently transmitted to the heat dissipation plate.

In the case where the outer side heat dissipation portion is the heat dissipation plate, a front end surface of the heat dissipation plate may extend straightly toward the widthwise outer side. However, the heat dissipation plate may preferably have a front end surface receding rearward as advancing to the widthwise outer side.

This configuration enables a vehicle front portion to be decorated in three dimensions, thereby further improving the designability of the vehicle front portion.

In the case where the outer side heat dissipation portion is the heat dissipation plate, the heat dissipation plate may be specialized in heat dissipation function. However, the front end surface of the heat dissipation plate may be preferably provided with an outer side turn lamp light emitter which extends along the front end surface and emits light toward the front of the vehicle.

This configuration enables a turn lamp to be configured using the heat dissipation plate.

Additionally, a vehicle according to the present invention comprises a bumper fascia base disposed in a front portion of the vehicle; a decoration member disposed at least widthwise both end portions of the bumper fascia base to decorate a front portion of the vehicle; and lamp units provided on widthwise both end portions of the bumper fascia base, the decoration member protruding forward of the bumper fascia and having a ridgeline extending along the vehicle width direction, each of the lamp units provided with a housing including a peripheral side wall having a front opening portion opened toward the front of the vehicle and a rear opening portion opened toward the rear side of the vehicle, and a lamp main body disposed in the housing, the lamp main body including a main body case extending in a longitudinal direction of the vehicle in a position closer to a widthwise outer side of the front opening portion, and spaced away from a widthwise outer edge of the front opening portion toward a widthwise inner side, and an inner side heat dissipation portion and an outer side heat dissipation portion protruding from the main body case to the inner side and outer side in the vehicle width direction, the outer side heat dissipation portion being a heat dissipation plate having the shape of a plate which protrudes greater than the inner side heat dissipation portion and extends in the longitudinal direction of the vehicle, the heat dissipation plate having a front end surface lying on an extension line of the ridgeline of the decoration member in a front view.

According to the present invention, since the front end surface of the heat dissipation plate is disposed on the extension line of the ridgeline of the decoration member in a front view, the heat dissipation plate functions as a part of the decoration member while ensuring heat dissipation of the lamp main body, and thus enables the front portion of the vehicle to have clear and sophisticated design in addition to the technical effect of the front structure of the vehicle.

In this case, the heat dissipation plate may be specialized for the heat dissipation function. However, the front end surface of the heat dissipation plate may be preferably provided with an outer side turn lamp light emitter which extends along the front end surface and emits light toward the front of the vehicle.

This configuration enables a turn lamp to be configured using the heat dissipation plate.

In this case, the decoration member may be preferably provided with a colored decoration main body which is colored to decorate the front portion of the vehicle, and an inner side turn lamp light emitter within the colored decoration main body in the vehicle width direction to emit light along the ridgeline.

This configuration enables longitudinally one end portion of the vehicle to be decorated three-dimensionally by the decoration member while allowing the decoration member to function as a turn lamp. Thus, the front portion of the vehicle can be simply decorated and appropriate illumination of the widthwise inner side by the turn lamp can be ensured.

The front structure for a vehicle and the vehicle having the front structure according to the present invention can reduce the difference in the cooling efficiency between a widthwise inner side portion and a widthwise outer side portion of the lamp main body by the outer side heat dissipation portion, thereby more effectively cooling the lamp main body in its entirety.

This application is based on Japanese Patent application No. 2017-179827 filed in Japan Patent Office on Sep. 20, 2017, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A front structure for a vehicle including lamp units provided in widthwise both end portions of a front portion of the vehicle, wherein each of the lamp units is provided with a housing including an inner peripheral side wall and an opposing outer peripheral sidewall, the inner peripheral sidewall being closer to a widthwise center of the vehicle in a direction transverse to a longitudinal direction of the vehicle than the opposing outer peripheral sidewall, the housing has a front opening portion opened toward a front of the vehicle and a rear opening portion opened toward a rear of the vehicle, a lamp main body is disposed in the housing, the lamp main body includes a main body case extending in the longitudinal direction of the vehicle and positioned closer to the opposing outer peripheral sidewall than the inner peripheral sidewall but spaced away from the opposing outer peripheral sidewall an inner side heat dissipation portion protrudes radially outward from the main body case in a direction toward and substantially perpendicular to a longitudinal axis of the vehicle, and an outer side heat dissipation portion protrudes radially outward from the main body case in a direction away from and substantially perpendicular to the longitudinal axis of the vehicle, and the outer side heat dissipation portion protrudes radially outward to a greater extent than the inner side heat dissipation portion.

2. The front structure for a vehicle according to claim 1, wherein the outer side heat dissipation portion is a heat dissipation plate in the shape of a plate extending toward the widthwise outer side and in the longitudinal direction of the vehicle.

3. The front structure for a vehicle according to claim 2, wherein the heat dissipation plate extends from a front end to a rear end of the main body case, and is integral with the main body case.

4. The front structure for a vehicle according to claim 3, wherein an outer side turn lamp light emitter is provided on a front end surface of the heat dissipation plate, the outer side turn lamp light emitter extending along the front end surface to emit light toward the front of the vehicle.

5. The front structure for a vehicle according to claim 3, wherein an outer side turn lamp light emitter is provided on the front end surface of the heat dissipation plate, the outer side turn lamp light emitter extending along the front end surface to emit light toward the front of the vehicle.

6. The front structure for a vehicle according to claim 2, wherein an outer side turn lamp light emitter is provided on a front end surface of the heat dissipation plate, the outer side turn lamp light emitter extending along the front end surface to emit light toward the front of the vehicle.

7. The front structure for a vehicle according to claim 2, wherein an outer side turn lamp light emitter is provided on the front end surface of the heat dissipation plate, the outer side turn lamp light emitter extending along the front end surface to emit light toward the front of the vehicle.

* * * * *